United States Patent

[11] 3,573,629

[72] Inventor Donald F. Buell
Baldwinsville, N.Y.
[21] Appl. No. 811,756
[22] Filed Apr. 1, 1969
[45] Patented Apr. 6, 1971
[73] Assignee General Electric Company

[54] TRANSFORMER POWER SUPPLY FOR REMOTE CONTROLLED RECEIVERS WITH PROVISION FOR FAST WARMUP
5 Claims, 1 Drawing Fig.

[52] U.S. Cl. .......... 325/390
[51] Int. Cl. .......... H04b 1/06
[50] Field of Search .......... 325/390, 492, 493, 494, 495; 328/260, 262, 268, 270; 178/6 (PS); 315/169 (TV)

[56] References Cited
UNITED STATES PATENTS 3,339,105 8/1967 Busse .......... 325/494
3,373,364 3/1968 Tumarkin et al. .......... 328/270

*Primary Examiner*—Robert L. Griffin
*Assistant Examiner*—Anthony H. Handal
*Attorneys*—Francis H. Boos, Jr., Harry B. O'Donnell, III, Harry F. Manbeck, Jr., Frank L. Neuhauser, Oscar B. Waddell and Joseph B. Forman

ABSTRACT: A transformer power supply for a remote controlled receiver provides reduced filament power in the OFF condition by increasing the primary to secondary turns ratio for the filament supply winding when the receiver is turned OFF. At the same time, the number of turns in the secondary winding supplying the remote control circuits is increased in the same ratio as the increase in the primary turns so as to maintain a constant operating voltage to the remote control circuits, thus enabling the receiver to be turned ON remotely. Switching of the turns in the various windings is provided by a relay connected across the low-voltage portion of the remote control supply winding.

Patented April 6, 1971 3,573,629
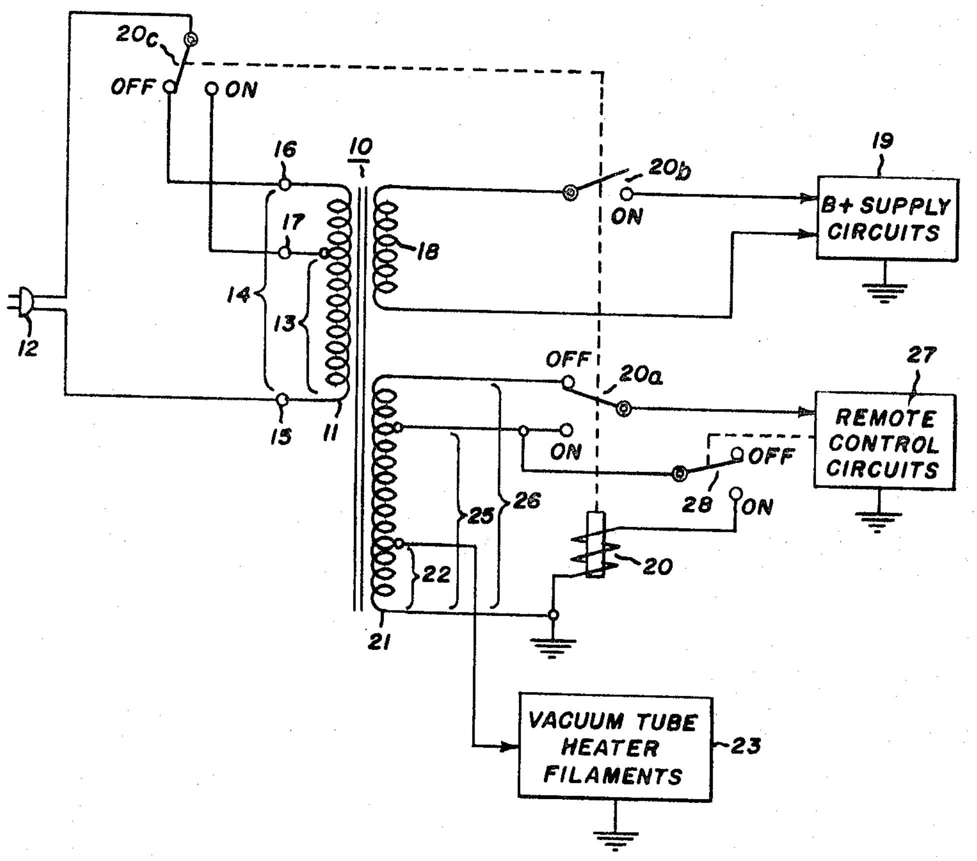
INVENTOR:
DONALD F. BUELL,
BY Francis H. Boos, Jr.
HIS ATTORNEY.

TRANSFORMER POWER SUPPLY FOR REMOTE CONTROLLED RECEIVERS WITH PROVISION FOR FAST WARMUP

BACKGROUND OF INVENTION

The use of circuits for providing fast warmup of vacuum tube heater filaments in television receivers, and the like, is well known. Typical of these are diode arrangements in which reduced filament power when the set is OFF is provided by half-wave rectification of the AC line voltage source. In one arrangement, for example, the B+ rectifier diode is interconnected with the ON/OFF switch so as to be switched out of the B+ supply circuit and in series with the filaments when the set is OFF. In another arrangement, a separate rectifier diode is connected in parallel with the ON/OFF switch and in opposite polarity with the B+ diode so that, when the receiver is turned OFF by opening the switch, half-wave rectification of the line voltage by the separate diode provides half power to the filaments and at the same time disables the B+ supply circuits because of the opposite polarity connection with the B+ diode.

These fast warmup circuits are normally employed only in AC/DC receivers because of the problems that would occur in attempting to adapt them to transformer-type power supplies used in AC only receivers. Normally the filament supply is provided in a transformer powered receiver via a secondary winding on the transformer. With an arrangement of this type, fast warmup operation has heretofore been provided by varying the turns ratio between the primary and filament supply windings of the power transformer. Preferably, this is done by switching to an increased number of turns in the primary winding while retaining the same number of turns in the filament supply winding.

Transformer power supplies are commonly found in top-of-the-line TV receivers in which it also may be desirable to include remote control circuits, or at least to have them available for optional inclusion at the customer's request. Ideally, remote control receivers should have the capability of being turned on remotely. This means that the remote control circuits must have normal operating voltage continuously applied to them when the set is otherwise turned OFF so they will respond to the ON command signal. Typically, these remote control operating voltages are AC voltages on the order of 24 volts and are supplied from the secondary winding of the power supply transformer.

Providing this kind of continuous remote operation with a transformer power supply adapted for fast warmup operation by turns ratio variation, as described above, presents a problem since varying the primary turns would also reduce the operating voltage to the remote control circuits during the OFF condition thus rendering them inoperative.

Consequently, it is an object of the present invention to provide a transformer type of power supply with fast warmup operation that enables normal operation of the remote control circuits during the OFF condition.

SUMMARY OF THE INVENTION

In accordance with the invention, a receiver power transformer includes a primary winding coupled to a means for supplying an AC line voltage and includes a plurality of secondary supply windings respectively coupled to filament means and the remote control circuit means in the receiver.

The primary winding and remote control supply winding each have two sets of turns corresponding respectively to the ON and OFF conditions of the receiver, with the turns ratio between associated winding sets being approximately the same for both conditions.

Control means, coupled in circuit with a secondary winding of the transformer and the receiver's ON/OFF switch, is adapted to switch the primary winding to an increased number of turns upon opening of the ON/OFF switch. The increased primary to filament supply winding turns ratio thus reduces the power supplied to the filaments. At the same time, the control means is adapted to switch the remote control supply winding to a correspondingly increased number of turns thus maintaining full operating voltage to the remote control circuits during the OFF condition. Upon closing of the ON/OFF switch, the control means responds to momentary transients in the secondary winding to switch all transformer windings back to the ON condition.

BRIEF DESCRIPTION OF THE DRAWINGS

The single FIGURE of the drawing shows a transformer type of power supply adapted for television receiver use and constructed in accordance with a preferred form of the invention.

DESCRIPTION OF EMBODIMENT OF INVENTION

In the drawing, the power supply transformer 10 has a primary winding 11 comprising two overlapping sets of turns 13 and 14 both sharing a common lower end terminal 15 which is coupled through the usual receptacle plug 12 to an AC line voltage source. The upper end terminal 16 of primary winding set 14 is coupled to plug 12 through the OFF contact of relay switch 20$_c$. An intermediate tap 17 of primary winding 11 constitutes the upper end terminal of winding set 13, and is coupled to the plug 12 through the ON contact of relay switch 20$_c$. As will be seen, winding set 14 corresponds to the OFF condition of the receiver, the term OFF being used herein to refer to that condition of the receiver sometimes known as STANDBY. The winding set 13 corresponds to the ON condition. Although not shown, a defeat switch can be inserted in the primary winding circuit to completely disable the receiver, as when the owner goes on vacation.

Transformer 10 also comprises a plurality of secondary windings including B+ supply circuit winding 18 coupled to conventional B+ supply circuits 19 via the contacts of a relay switch 20$_b$. A further secondary winding 21 includes a filament supply winding set 22 across which approximately 6 volts is developed in the ON condition to supply operating voltage to the vacuum tube filaments 23. Although shown as a segment of a larger winding 21, the filament supply winding 22 could alternatively be a separate secondary winding on the core of transformer 10 without departing from the scope of the present invention. This is also true of the various other combined windings shown in the drawing.

In accordance with one aspect of the invention, secondary winding 21 serves as a remote control supply winding comprising two sets of turns 25 and 26 similar to the primary winding corresponding respectively to the ON and OFF conditions of the receiver. The number of turns in winding set 25 and set 26 are chosen relative to the associated primary winding sets 13 and 14 such that the primary to the secondary turns ratio between the associated winding sets 13 and 25 corresponding to the ON condition is the same or at least approximately the same as the turns ratio between the associated winding sets 14 and 26 corresponding to the OFF condition. As previously mentioned, this is done so as to maintain full operating voltage via relay switch 20$_a$ to remote control circuits 27 in both the ON and OFF conditions of the receiver.

In accordance with another aspect of the invention, the switching of the transformer windings between the ON and OFF conditions is provided by control means comprising relay winding 20 and associated relay switches 20$_a$—$_c$. As illustrated in the drawing, relay winding 20 is connected in series with the receiver ON/OFF switch 28 and remote control winding 25. Relay winding 20 may be a normal 24 volt winding similar to those used in the remote control circuits 27 in which case it is convenient to operate it from the existing remote control supply winding 25. However, a separate winding might also be used for this purpose. ON/OFF switch 28 is preferably both manually and remotely operable.

In operation when ON/OFF switch 28 is turned OFF (opened), the AC voltage applied to relay winding 20 is disabled causing remote relay switch 20$_a$ to change the number of remote supply winding turns from set 25 to set 26. It also causes relay switch $20_b$ to open thus disabling the B+ supply circuits. Further, it causes relay switch $20_c$ to change from the ON contact corresponding to primary winding 13 to the OFF contact corresponding to the increased number of turns of primary winding 14. Since the primary to filament winding turns ratio is increased, the filament voltage is reduced. However, the change from remote winding set 25 to remote winding set 26 maintains the same turns ratio thus maintaining the full operating voltage on remote control circuits 27. In an actually constructed embodiment, the remote operating voltage of 24 volts appearing across winding 25 was found to reduce to approximately 15 volts during the OFF condition. The filament voltage reduced to approximately 4 volts.

When the ON/OFF switch 28 is turned on (closed) the 15 volts across winding 25 is applied directly across relay winding 20. Although the 15 volts is sufficient to initiate the switching action of the relay to the ON condition it would be insufficient to hold the relay switches at the ON contacts were it not for the interaction between windings caused by the transformer coupling. However, with the relay winding connected as shown no additional circuit connections or elements are needed to prevent an unstable oscillatory (buzzing) condition since the momentary interruption of the primary circuit via switch $20_c$ includes a substantial pulse of current through relay winding 20. This momentary current is sufficient to cause the relay winding 20 to hold the switches $20_a$—$_c$ in the ON condition long enough to establish the full 24 volts across relay supply winding 25 thus maintaining the power supply in the ON condition. Consequently, a simple, low cost circuit has been described which provides the combined advantages of fast warmup and continuous remote control operation in a transformer power supply.

In the actually constructed embodiment the following winding relationships were used:

Winding 13=172 turns

Winding 14=280 turns

Winding 18=479 turns

Winding 22=10 turns

Winding 25=38 turns

Winding 26=58 turns

I claim:

1. A transformer type of power supply for remote controlled receivers having remote control circuit means to which normal operating voltage must be supplied when the receiver is in the OFF condition so that it can be turned ON remotely, an also having vacuum tube means with heater filaments to which reduced power is supplied during the OFF condition to provide fast warmup when the receiver is turned ON, said power supply comprising:
   - means for supplying an AC line voltage;
   - a power transformer including a primary winding coupled to the line voltage supply means and including a plurality of secondary supply windings respectively coupled to said filament means, and said remote control circuit means, the primary winding and remote control supply winding each having two sets of turns corresponding respectively to the ON and OFF conditions of the receiver, the turns ratios between associated winding sets being approximately the same or both conditions;
   - an ON/OFF switch; and
   - control means coupled in circuit with a secondary winding of the transformer and with the ON/OFF switch, said control means being responsive to turning OFF the ON/OFF switch for increasing the turns in the primary winding thus increasing the turns ratio between the primary and filament supply windings so as to reduce the filament power, and for correspondingly increasing the turns in the remote control supply winding thus maintaining full operating voltage to the remote control circuits.

2. A transformer type of power supply according to claim 1 in which the receiver includes a DC supply means, the transformer includes a secondary supply winding adapted to be coupled to the DC supply means and the control means includes switch means for disabling the coupling of said supply winding to the DC supply means when the receiver is turned OFF and for enabling the coupling when the receiver is turned ON.

3. A transformer type of power supply according to claim 1 in which the control means includes a relay winding coupled across that set of the remote control supply winding having the lesser number of turns.

4. A transformer type of power supply according to claim 3 in which the transformer primary winding includes remote end terminals and an intermediate terminal respectively defining said two sets of turns of the primary winding, one of the remote end terminals being adapted to be coupled to the AC line voltage supply means in the OFF condition and the intermediate terminal adapted to be coupled to the AC line voltage supply means in the ON condition and in which the control means includes a relay switch connected between the one end terminal and intermediate terminal and the line voltage supply means, the relay switch being activated by the rely winding to alternatively couple said terminals to the AC line voltage supply means.

5. A transformer type of power supply according to claim 1 in which the control means includes a relay winding connected in series circuit with the ON/OFF switch and that set of the remote control supply winding having the lesser number of turns, the voltage across said lesser number of turns being sufficient to fully energize the relay winding during the ON condition but only to partially energize it in the OFF condition; said control means further including a relay switch connected between the AC line voltage supply means and the two sets of turns of the primary winding and being responsive to said relay winding when the ON/OFF switch is turned ON to interrupt momentarily the power applied to the primary winding as the relay switch changes the AC line voltage over from one set of turns in the primary winding to the other thus producing a pulse of current though the relay winding sufficient to cause the relay winding to become momentarily fully energized long enough to complete the changeover of AC line voltage, thereupon providing full voltage across the relay winding to hold said relay switch in the ON condition.